Sept. 13, 1932.  R. E. W. HARRISON ET AL  1,877,572
GRINDING MACHINERY
Filed Aug. 17, 1928  5 Sheets-Sheet 3

Inventor
ROBERT E. W. HARRISON,
FREDERICK S. HAAS,
GEORGE W. BINNS,
By A. K. Parsons
Attorney Sept. 13, 1932.  R. E. W. HARRISON ET AL  1,877,572
GRINDING MACHINERY
Filed Aug. 17, 1928  5 Sheets-Sheet 4

Inventor
ROBERT E. W. HARRISON,
FREDERICK S. HAAS,
GEORGE W. BINNS,
By HKParsons
Attorney Patented Sept. 13, 1932

1,877,572

UNITED STATES PATENT OFFICE

ROBERT E. W. HARRISON, FREDERICK S. HAAS, AND GEORGE W. BINNS, OF CINCINNATI, OHIO, ASSIGNORS, BY MESNE ASSIGNMENTS, TO THE HEALD MACHINE COMPANY, OF WORCESTER, MASSACHUSETTS, A CORPORATION OF MASSACHUSETTS

GRINDING MACHINERY

Application filed August 17, 1928. Serial No. 300,228.

This invention relates to improvements in grinding machinery and has particular reference to a machine intended for internal grinding purposes.

One of the principal objects of the present invention is the provision of a machine which may be utilized to advantage in rapid production of ground internal surfaces on brake drums or like tubular articles.

A further object of the invention is the provision of a mechanism which will facilitate to a large degree insertion and removal of large work pieces from a machine for the internal grinding thereof and which will thus lessen the efforts of the operator as well as the danger from injury in connection with said work.

A further object of the invention is to provide for movement of the workpiece into operative relation to the grinding wheel and withdrawal of said workpiece from operative relation by oscillation either of said workpiece or of said grinding wheel and to this end the invention involves a machine having an oscillatory carriage on which the grinding wheel or the workpiece may be mounted.

An additional object of the invention is the provision of a machine particularly adapted for internal grinding in which through the employement of a relatively fixed position grinding wheel and movable work holder the grinding wheel drive may be rendered both simple and durable, and the handling and inspection of the work facilitated.

Other objects and advantages of the present invention should be readily apparent by reference to the following specification considered in conjunction with the accompanying drawings forming a part thereof, and it will be understood that we may make any modifications in the specific structural details hereinafter disclosed within the scope of the appended claims without departing from or exceeding the spirit of our invention.

In the drawings the numeral 25 designates the bed of the machine having mounted thereon wheel head bearing 26 for the grinding wheel spindle 27 carrying a grinding wheel 28. An oscillator mechanism 29 serves to impart a slight reciprocating movement to the grinding wheel and spindle to prevent scoring of the work and to equalize the wear on the grinding wheel surface. Power for actuation of the grinding wheel is suitably transmitted from motor 30 carried by the bed 25 to the grinding wheel spindle. Due to the fact that the grinding wheel does not move into and out of the work as is customary in internal grinding, both a rigid support for the wheel and a positive rugged drive may be utilized, thus increasing the accurate metal removing capacity of the machine.

Figure 7:
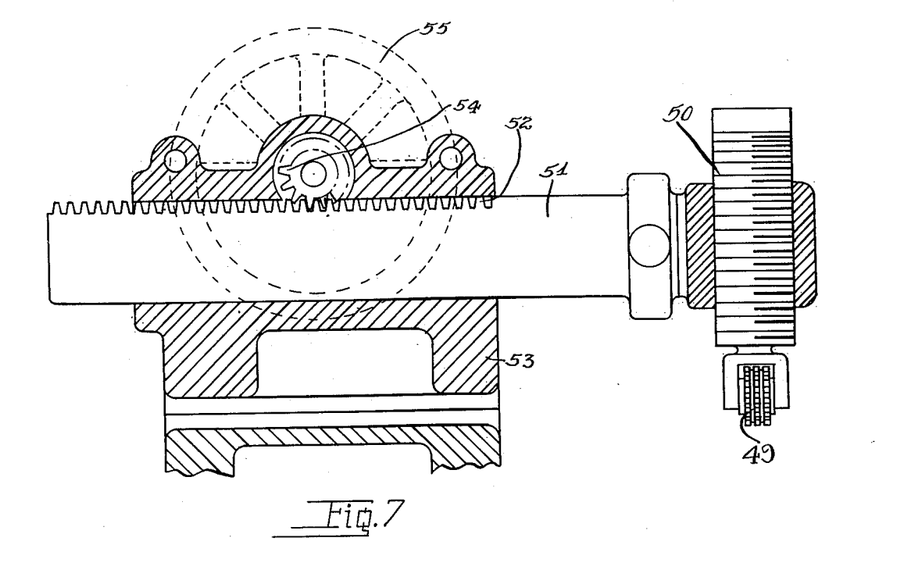
Figure 7 is an enlarged longitudinal sectional view of the truing mechanism for the grinding wheel.

To maintain the condition of the surface of grinding wheel 28 use is made of a suitable truing mechanism such as the metal truer or dressing tool 49 shown in Figure 7 as carried by the vertically adjustable shank 50 on the outer end of arm 51 having a rack portion 52 sliding within the truer bracket 53 and controlled by pinion 54 and hand wheel 55 which operates to reciprocate the dressing tool over the surface of the workpiece.

Figure 8:
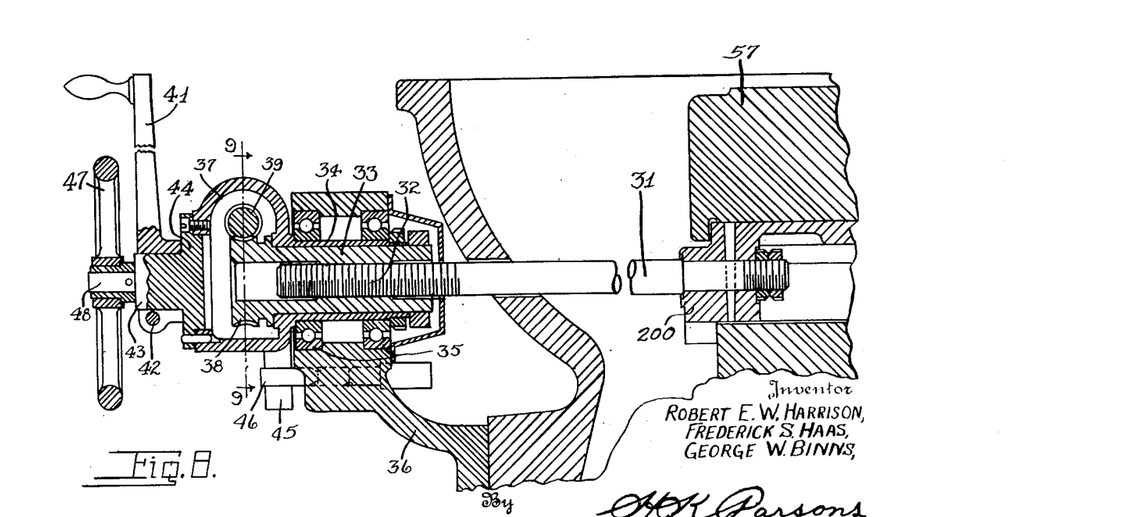
Figure 8 is a section through the wheel feed adjusting mechanism.

Either the workpiece or the grinding wheel is mounted on an oscillatory member by which the workpiece may be placed in operative relation to the grinding wheel and a radial feeding movement is imparted either to the work or to the grinding wheel to procure a cutting operation on the workpiece. In the present instance we have illustrated a swinging work carrier 57 which is mounted on a slide 200, the latter being movable toward and away from the operative face of the wheel, but it will be understood that alternatively the wheel head could be mounted on a slide and the same adjusting mechanism utilized to impart feeding movement thereto. This transverse feeding movement and positive controlling mechanism therefor includes a rapid in-feed movement coupled with a fine or micrometer adjustment to take up the wear on the grinding wheel. This mechanism is particularly illustrated in detail in Figure 8 and comprises the adjusting rod 31 pinned to slide 200 and having its forward end threaded as at 32 for engagement with the interiorly threaded sleeve 33 rotatably mounted within the bushing 34 supported by bearings 35 for free rotation within bracket 36 of bed 25.

Bushing 34 has integrally formed thereon the housing or casing 37 which encloses worm wheel 38 on the forward end of sleeve 33. This worm wheel has meshing therewith worm 39 journaled in the housing 37 and formed with an exterior operating wheel 40, Figs. 1 and 2, by which the worm may be rotated. This rotation is imparted to the worm wheel and sleeve 33. Inasmuch as the latter is held by its bearing against longitudinal movement, an in and out movement will be imparted to the screw rod 31 and thus to the slide which may accordingly be very accurately adjusted to compensate for wear of the grinding wheel or additional amount of cut which it is desired to take.

Figure 9:
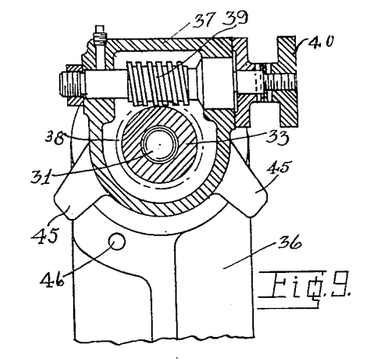
Figure 9 is a sectional view on the line 9—9 of Figure 8.

For ordinary operations a definite amount of rotation is given to the sleeve bushing and associate parts as an entity. This is effected through handle 41 adjustably clamped as by screw 42 on stud 43 of cap plate 44 forming a forward closure for the housing 37. The movement thus effected is calculated to be sufficient to provide the necessary clearance between the grinding wheel and work when a fresh piece of work is inserted and in its opposite movement to shift the work to remove the necessary stock to produce a predetermined interior diameter on the brake drum. The two limits of oscillatory movement are determined by the lugs 45 formed exteriorly on the housing 37 and cooperating with the intermediately disposed stop pin 46 on bracket 36 (see Fig. 9). It will be understood that the handle 41 is utilized solely for the individual feeding operations and similarly that due to its slow action the micrometer adjusting wheel 40 is utilized only to compensate for slight wheel wear or the like. To facilitate rapid adjustment of the position of the work relative to the grinding wheel in initially setting up the machine, when wheels are to be replaced, or the like, use is preferably made of the hand wheel 47 carried by the reduced projection 48 of stud 43. To facilitate this adjustment clamp screw 42 is loosened allowing handle 41 to ride freely on stud 43 and stop pin 46 is pushed inward out of the path of movement of the lugs 45, when the casing 37 as an entirety, with its bushing and engaged sleeve, may be freely rotated for the desired cross adjustment of the parts, after which pin 46 is reversely shifted and the final fine adjustment accomplished through the utilization of worm 39.

Figures 3, 4:
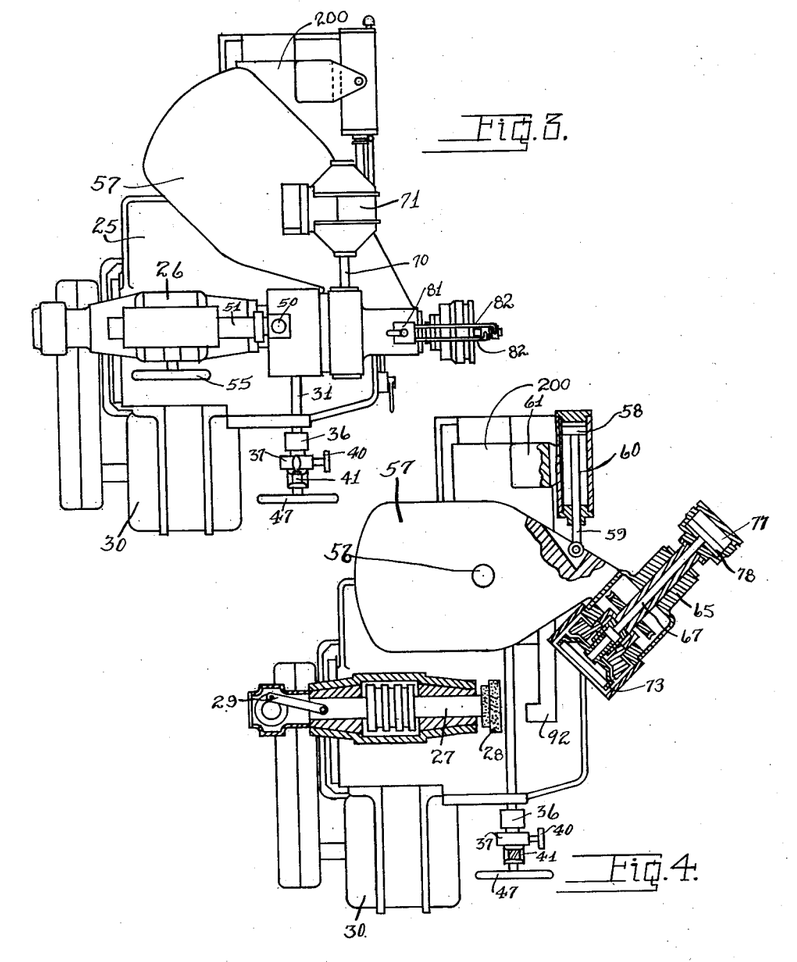
Figure 3 is a plan view of the machine of Figure 1 with the parts in operative position.
Figure 4 is a horizontal sectional view of the machine substantially along the line 4—4 of Fig. 2 with the parts in the open position of Figure 1.

The present mechanism is particularly applicable for use in grinding the interior of automobile brake drums. As these drums are of appreciable weight it is desirable for quantity production that the labor of handling same be reduced to a minimum and that the mechanism at the same time be of such nature that the pieces may be placed in and removed from the machine with minimum danger to the operator from the rotating grinding wheel or the rotation of work itself. In the attainment of these desiderata the slide 200 is provided with a trunnion as at 56 about which oscillates the work spindle carrier 57. Oscillatory movement is effected through piston 58 having its rod 59 pivoted to carrier 57 and its cylinder 60 swung in bracket 61. This piston may be actuated satisfactorily by compressed air through lines 62 and 63 leading to opposite ends of the cylinder and supplied by air from a suitable source as controlled by valve 64 at the operator's station of the machine. Shifting of the valve in one direction will introduce pressure back of the piston swinging and holding the carrier in operative position as shown in Figure 3 while introduction of air at the opposite end of the cylinder by reversal of the valve will move the carrier into the open position shown in Figures 1 and 4. The pivotal mounting of cylinder 60 allows it to swing and accommodate itself to the oscillating movement of the carrier.

Journaled in the bearing portion 65 of the carrier, as in the anti-friction bearings 66, is the work supporting spindle 67 bearing worm gear 68 driven by worm 69 on shaft 70 of motor 71 which is mounted on the oscillating carrier. Spindle 67 carries the chuck head 700, shown in Figure 5, which has the positioning pins 710 for contact with the bell portion 72 of the brake drum 73. Head 700 is further provided with the draw-in collet 74 actuated by piston rod 75 to clampingly engage the hub 76 of the brake drum. Rod 75 extends into piston chamber 77 having therein the piston 78 adapted to be air actuated as through port 79 introducing air into the forward portion of the chamber to retract the piston or into passage 80 pushing the piston into releasing position to permit of withdrawal of the work. It is to be understood that the air pressure in question is controlled by valve 81 through lines 82 and 83 to ports 79 and 80 respectively and that a suitable rotary coupling is made between the casing of chamber 77 and the lines 82 and 83 to permit of free rotation of the spindle and air operated draw-in collet mechanism.

Figure 6:
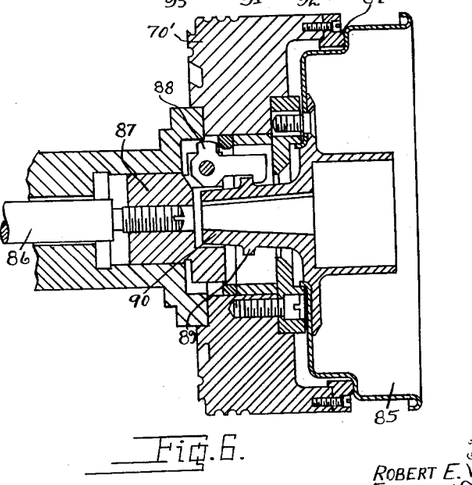
Figure 6 is an enlarged section showing a slightly different form of work piece and retaining clutch therefor.

An alternative form of chuck mechanism is illustrated in Figure 6 in which the head 70' has the positioning rim 84 for contact with the brake drum member 85 and draw rod 86 is utilized for shifting of head 87 bearing the clamp fixtures 88 for inter-locking engagement with flange 89 on the brake drum hub 90. In this form there is therefore a direct mechanical inter-lock between the parts in place of a more fractional clamping action as in the previously described form. The manner of actuation of both rod 75 and rod 86 is identical, the valve 81 being grasped by the operator and shifted into released position when the work is to be withdrawn and re-shifted to automatically clamp the fresh work piece.

Figure 5:
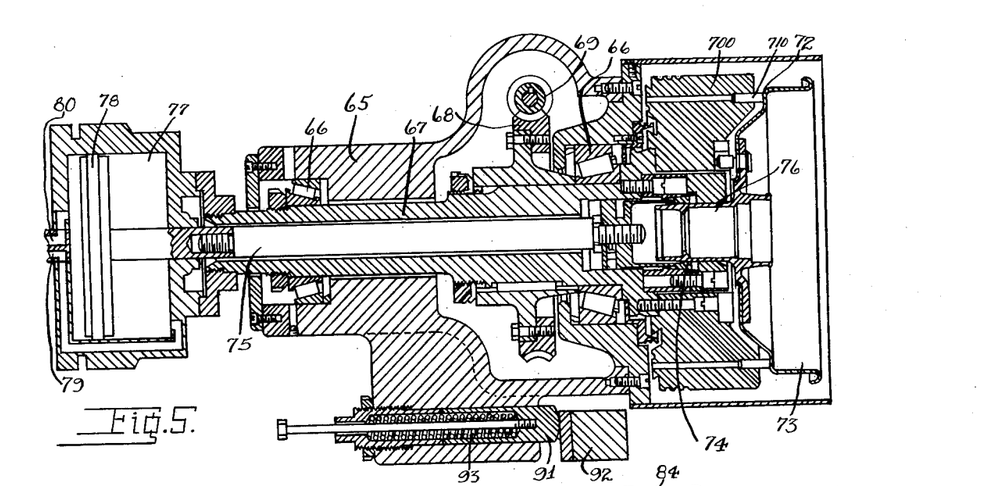
Figure 5 is an enlarged longitudinal sectional view through the brake drum holding and driving means.

As the piston 58 serves to impart a relatively rapid movement to the carrier 57 to minimize idle time of the machine, a suitable shock absorber contact such as a plunger 91, Fig. 5, is preferably mounted on the carrier in positon to engage the abutment 92 on slide 200. Consequently as the carrier is swung into closed position spring 93 will be compresed, taking up the shock of the closing movement and easing the parts into place.

It will be noted by reference to Figure 3 that when the parts are in closed or operative position the grinding wheel spindle 27 and work carrier spindle 67 will be in parallel relation but staggered in a horizontal plane out of axial alignment due to the fact that the grinding wheel is slightly less in diameter than the interior of the diameter of the brake drum to be ground.

The parts having been brought into this relationship as shown in Figure 3 oscillation of handle 41 will cause the work spindle slide to be gradually fed to carry the workpiece radially, the prescribed amount, toward the grinding wheel and because of the continuous rotation of the drum, as effected by its driving motor, all portions of the interior of the drum will be equally presented to the action of the grinding wheel so that a true cylindrical internal surface will be formed thereon, facilitating proper brake adjustment and action when the parts are put into use.

During the grinding the action of oscillator 29 imparts a slight back and forth traversing movement to the grinding wheel tending to maintain proper surface thereon and preventing scoring of the work or unequal wear upon the wheel. When the grinding has been completed handle 41 is reversely actuated by the left hand of the operator moving the slide and work away from the grinding wheel. At the same time the operator will grasp and actuate valve 64 with his right hand, introducing air to cylinder 60 causing retraction of the piston and movement of the work spindle carrier into open or inoperative position. As the carrier moves into open position pin 94 on its under side will contact with one of the arms 95 on coolant controlling valve 96 shutting the valve and thus checking the flow of coolant through pipe 97 to the work. During this movement the automatic work stopping mechanism also comes into operation. This mechanism and its operation will be best understood by reference to Figures 10 and 11 of the drawings.

Figure 10:
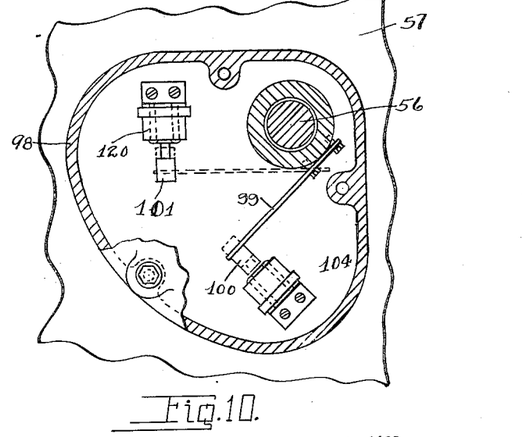
Figure 10 is a fragmentary horizontal section through the electrical switch control device.

Secured to the trunnion member 56 within the casing flange 98 on the carrier is the spring arm 99 for alternative engagement with the circuit controlling plungers 100 and 101. The general motor actuating and controlling circuit is diagrammatically indicated in Figure 11, current coming into the system through the positive line 102 and the circuit being completed through line 103. When the parts are in operative position as shown in Figure 10 arm 99 depresses or forces plunger 100 into switch casing 104. This moves switch member 105 against the action of release spring 106 closing the circuit through line 107, relay 108, switch 105 and line 109 to solenoid 110. The circuit then continues through line 111, switch 112 and line 113 to the main return line 103. It will be understood that the closing of a circuit through relay 108 will actuate this relay to hold switch 105 in closed position completing the controlled circuit, while this completion of the circuit will energize the solenoid 110 to close switch 114 of the motor circuit 115—103. The drive motor 71 will then start operating just as the carrier is swinging into its final closed position and at the same time shunt circuit 116 will be completed through solenoid 117 releasing brake 118 which is normally urged into operative position by the spring 119 for automatic stopping of the work spindle. The parts will continue in their rotation so long as the carrier is in closed position and will also continue to rotate in the event that the carrier is swung but partially open for inspection of grinding wheel, work or the like.

Figures 11, 12:
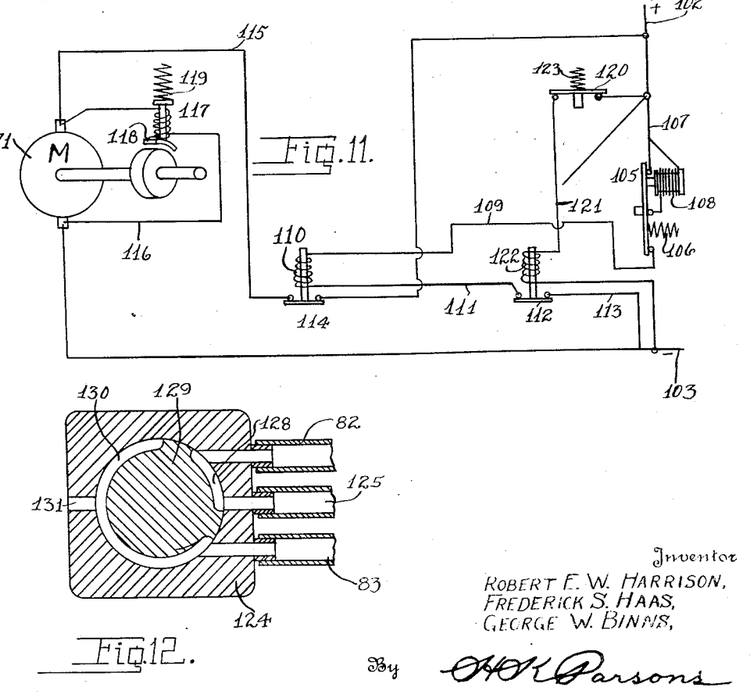
Figure 11 is a diagrammatic view of the electrical circuit of the machine.
Figure 12 is a horizontal section through one of the control valves of the machine as on line 12—12 of Figure 2.
Figure 13:
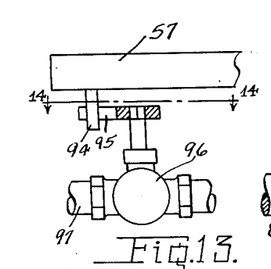
Figure 13 is a fragmentary view of the coolant control mechanism.
Figure 14:
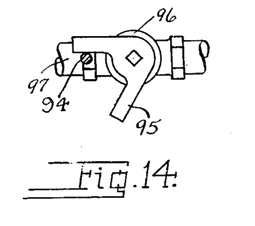
Figure 14 is a section on the line 14—14 of Figure 13.

However, when the carrier is swung into full open position arm 99 will alternatively engage control plunger 101 thus opening the stop switch 120 in line 121 which has intermediately therein the solenoid 122 controlling switch 112. When this is de-energized gravity or the like will cause switch 112 to open thus breaking the main control circuit which will in turn de-energize solenoid 110 breaking the motor circuit and also de-energize relay 108 allowing starting switch 105 to open. The carrier may then be swung into a partially closed position without effecting a starting of the motor due to the fact that while spring 123 will close stop switch 120 re-energizing solenoid 122 and closing switch 112, the starting switch 105 will remain open until plunger 100 is brought into contact with arm 99 as previously described.

As the control valves for the clutch, for the carrier controlling piston and the like are of the same general nature, but one of these has been shown in detail as comprising the valve casing 124 having the inlet 125 and the pair of alternatively employable pressure lines 82 and 83 selectively couplable by passage 128 of the valve body 129 with the inlet 125 and leading to the opposite ends of the piston cylinder to be actuated thereby. The valve has a second three-quarter circumferential passage 130 serving selectively to couple the unused pressure line with the passage or port 131 so that the pressure at one side of the piston is relieved when pressure is applied to the opposite side thereof.

Figure 1:
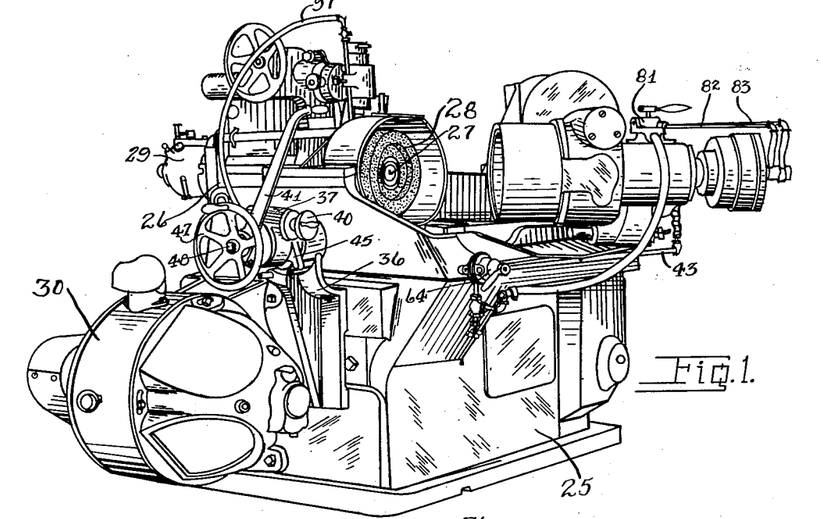
Figure 1 is a perspective of our improved machine.
Figure 2:
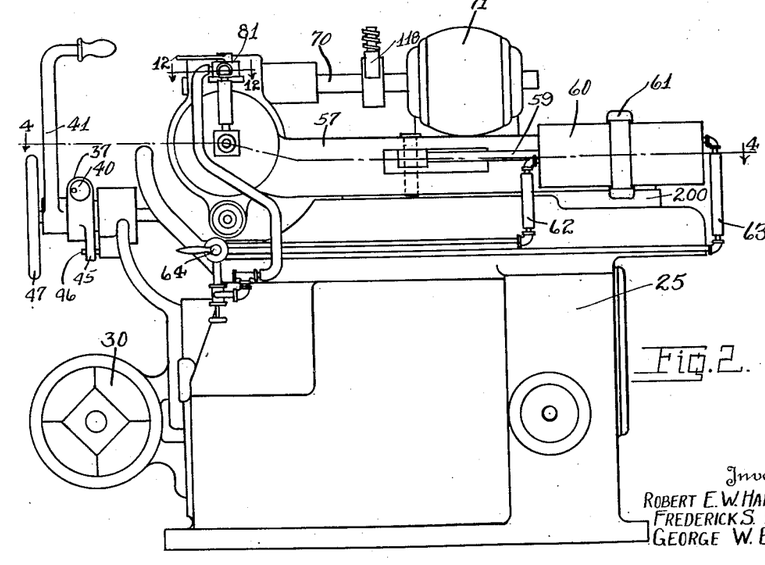
Figure 2 is a side view thereof.

In the operation of the machine the carrier is swung into open position as shown in Figure 1 and a brake drum or other work piece inserted by the operator within the chuck. Valve handle 81 is turned to actuate the air chuck and clamp the work into position. Valve 64 is then actuated admitting pressure to the rear of piston 58 causing the carrier to swing forward to the closed position shown in Figure 3 and during this closing movement pin 94 on the under side of the carrier by contact with valve control arm 95 opens the coolant valve so that coolant is suitably supplied at the working points. Also as the carrier moves into closed position switch plunger 100 is engaged by arm 99 to complete the hereinbefore described circuits releasing brake 118 and starting the drive motor 71 causing rotation of the work. Control handle 41 is then oscillated to impart proper feeding movement to the slide 26 pressing the work toward the grinding wheel for proper internal stock removal therefrom. When the handle has been brought up against its stop the grinding is completed, and the handle is reversed, moving the work back away from the wheel. The operator then manually turns valve 64 to cause the carrier to swing open, and by shifting of valve 81 releases the work. During the opening movement of the carrier brake 118 has checked the revolution of the work so that it is stationary and can be handled safely by the operator as soon as the grip of the chuck has been released.

From the foregoing it will be seen that there has been provided an extremely simple and efficient mechanism in which the grinding itself is both readily and safely effected, in which the work is rapidly moved to an accessible position distant from the grinding wheel where it may be quickly withdrawn and a new work piece substituted with maximum of safety to the operator as well as facility in handling of relatively heavy work pieces of the nature here under consideration.

It will further be noted that the wheel may be readily trued in the event that the oscillation imparted thereto proves insufficient to maintain proper surface thereon or for any other reason, and that the work under normal conditions receives a predetermined infeed and retracting movement but may be readily given either a rapid adjustment or a very fine feed to compensate for wheel wear.

We claim:

1. A grinding machine including a rotary grinding wheel, an oscillatable work carrier movable to operatively associate and disassociate a work piece with the grinding wheel, and means for automatically controlling the rotation of the work as it is presented to and withdrawn from the grinding wheel.

2. A machine of the character described including a grinding wheel, an oscillatable carrier for presenting work to the grinding wheel, means for rotating the work, and automatic controls operative at the limits of oscillation of the carrier for respectively starting and stopping the rotation of the work.

3. An internal grinder including a bed or support, a rotary grinding wheel thereon, a rotary work holder oscillatable from a work receiving and discharging position to a position with the work in operative relation to the grinding wheel, means for imparting an oscillatory movement to the work holder from one to the other of these positions, and means for relatively translating the grinding wheel and work to feed the wheel into the work.

4. An internal grinder including a bed or support, a rotary grinding wheel thereon, a rotary work holder oscillatable thereon, means for supporting and imparting an oscillatory movement to the work holder about an axis remote from the point of grinding to present work to the grinding wheel and move same out of operative relation thereto, means for relatively translating the grinding wheel and work to feed the wheel into the work, and additional means for axially reciprocating the grinding wheel to traverse the work.

5. A grinding machine including an oscillatable work carrier, movable from a work receiving and discharging position to an operative position for effecting a stock removal from the work piece, a rotary work holder carried thereby, means for rotating the work holder, means for oscillating the carrier and holder, and means operated on oscillation thereof for starting and stopping the rotation of the work holder.

6. In a mechanism of the character described the combination with a movable work carrier of a work holder rotatably mounted thereon, means for positively rotating the work holder, automatic control mechanism actuable on oscillation of the carrier for controlling the application of power to the work holder, and additional means for positively checking the rotation of the work holder.

7. In an internal grinder or the like, the combination with a bed, of a feed slide movably mounted thereon, means for adjusting the slide including a nut, a screw fitting therein, a casing for one of said parts, means for rotating the casing and contained part, and additional means carried by the casing for imparting rotary adjusting movement to the part relative to the casing.

8. In a machine of the nature described, the combination with a bed, of a slide movably supported thereby, a screw member carried by the slide, a nut rotatably supported by the bed against axial movement, a casing enclosing the nut, means carried by the casing for rotating the nut with respect thereto or for locking the nut to the casing, means for oscillating the casing, and stop means for limiting the oscillation thereof.

9. A machine of the character described including a bed or support, a grinding wheel unit mounted thereon, a work holding unit also mounted thereon, one of said units being supported for oscillatory movement relative to the other, a grinding wheel carried by the grinding wheel unit, a work holder carried by the work holder unit, means for rotating said grinding wheel and said work holder, and automatic means for controlling the rotation of one of said parts including a lost motion connection operative on oscillation of the member to start said rotation at the completion of the movement of the member in one direction and to stop said rotation at the completion of the movement of the member in the opposite direction.

10. A machine of the character described including a bed or support and a unit oscillatable thereon, an oscillatable cylinder supported by the bed, a piston movable within the cylinder, connections between the piston and the unit for actuation of the unit thereby, and control means for alternately directing fluid to the opposite ends of the cylinder to oscillate the unit.

11. A machine of the character described, including a bed or support and a unit oscillatable thereon, an oscillatable cylinder supported by the bed, a piston movable within the cylinder, connections between the piston and the unit for actuation of the unit thereby, control means for alternately directing fluid to the opposite ends of the cylinder to oscillate the unit, and means for reducing the impact of the unit.

12. An internal grinder including a bed or support, a grinding wheel carried thereby, an oscillatable work supporting unit carried by the bed, power means for oscillating the unit, power means for rotating the work holder, and means for automatically controlling the actuation of one of said power means.

13. A machine of the character described including a bed or support, a grinding wheel carried thereby, an oscillatable carrier movable toward and from the grinding wheel, a rotatable work holder on the carrier, power means for actuating the work holder, means for automatically actuating the power means as the work holder approaches the grinding wheel, means for de-energizing the power drive as the work is withdrawn from operative relation to the grinding wheel, and additional means for positively checking the rotation of the work holder when the power is disconnected therefrom.

14. In an internal grinding machine, the combination with a grinding wheel, of a work carrier oscillatable toward and from the grinding wheel, a work holding member mounted on the carrier a hydraulic source of power, means actuable thereby for retaining work within the holder, and additional hydraulic means actuated by the hydraulic pressure source for imparting oscillation to the carrier when the work is so held.

15. An internal grinder including a bed or support, a slide carried thereby for rectilinear movement, a grinding wheel, a second slide member mounted for oscillatory movement, in a plane parallel to the movement of the first mentioned slide, a work supporting unit on the second slide movable into and out of operative relation to the grinding wheel, manual means for shifting one of said slides, power means for shifting the other of said slides to jointly operatively relate the work and grinding wheel, means for rotating the grinding wheel and the work supporting unit, and means for automatically controlling the rotation of one of said members as the parts are shifted into and out of operative relation.

16. An internal grinder including a bed or support, a grinding wheel member and a work holding member, one of said parts being mounted for rectilinear translatory movement and the other of said parts for oscillatory movement, power means for causing a relative approach of said parts, means for automatically effecting rotation of one of said members as the parts are brought into operative relation, means for automatically supplying coolant to the parts when in said position, and means for stopping the rotary member and flow of coolant when the parts are relatively separated.

17. A grinding machine including a grinding wheel for interior engagement with a work piece, a work carrier, means supporting the carrier for oscillation from a work receiving and discharging position to an operating position with the work in circumscribing relation to the grinding wheel, and means for imparting oscillation to the carrier from one position to another.

18. An internal grinder including a bed, a grinding wheel supported thereon, a work carrier, means supporting the carrier for oscillation from a loading and discharging position to a position in operative position with the work in circumscribing relation to the grinding wheel, and means for axially reciprocating the grinding wheel relative to the work.

19. In a grinding machine the combination of a bed, a grinding wheel rotatably carried thereby, an oscillatable work carrier supported by the bed swingable from a work receiving and discharging position to a position adjacent the grinding wheel, and means for stopping and starting the rotation of the work when in said positions including an electric motor for rotating the work, a starting switch connected with the motor, a stopping switch connected with the motor, and a switch arm movable with the carrier for engaging the starting switch when the work and carrier are adjacent the grinding wheel and for engaging the stopping switch when the work and carrier are remote therefrom in the loading and unloading positions.

20. In a grinding machine the combination of a bed or support, a grinding wheel carried by the bed, an oscillatable work carrier swingable from a position remote from the grinding wheel to a position adjacent thereto, and means for translating the work and wheel relative to one another including a screw, a nut threadedly engaging the screw, and a manually actuable lever for rotating either the nut or screw relative to the other and effecting a feeding movement between the wheel and work of a definite increment.

21. In a grinding machine the combination of a bed or support, a grinding wheel carried by the bed, an oscillatable work carrier swingable from a position remote from the grinding wheel to a position adjacent thereto, means for translating the work and wheel relative to one another including a screw, a nut threadedly engaging the screw, a manually actuable lever for rotating either the nut or screw relative to the other and effecting a feeding movement between the wheel and work of a definite increment, and additional means for actuating either the nut or screw relative to the other independent of the manual actuating lever to thereby change the zone of feeding movement of either the work or wheel without varying the feeding increment of the manual lever.

22. In a grinding machine the combination of a bed, a grinding wheel rotatably carried thereby, an oscillatable work carrier shiftable from a work loading and unloading position to the position having the work adjacent the grinding wheel, and means controlling the rotation of the work including an electric motor for rotating the work, an electrical circuit for the motor, a starting switch in the circuit, a stopping switch in the circuit, an arm for sequential engagement with the starting and the stopping switches as the carrier is shifted into and out of operative engagement with the work, and a magnetic brake in the electrical circuit for stopping rotation of the motor and work upon actuation of the stopping switch.

23. In a grinding machine the combination of a bed, a grinding wheel rotatably carried thereby, an oscillatable work carrier shiftable from a position remote from the grinding wheel and having the axis of the work disposed at an angle to the axis of the wheel for loading and unloading the work in the carrier to a position adjacent the grinding wheel having the axes of the work and wheel in spaced parallelism, and means for effecting a relative lateral shifting of the axes of the work and wheel to effect a stock removal from the work.

24. In a grinding machine the combination of a bed, a grinding wheel rotatably carried thereby, an oscillatable work carrier shiftable from a position remote from the grinding wheel and having the axis of the work disposed at an angle to the axis of the wheel for loading and unloading the work in the carrier to a position adjacent the grinding wheel having the axes of the work and wheel in spaced parallelism, means for effecting a relative lateral shifting of the axes of the work and wheel to effect a stock removal from the work, and means automatically starting and automatically stopping the rotation of the work when the carriage is respectively in the position adjacent the wheel and remote therefrom.

25. In a grinding machine the combination of a bed, a grinding wheel rotatably carried thereby, an oscillatable work carrier shiftable from a position remote from the grinding wheel and having the axis of the work disposed at an angle to the axis of the wheel for loading and unloading the work in the carrier to a position adjacent the grinding wheel having the axes of the work and wheel in spaced parallelism, means for effecting a relative lateral shifting of the axes of the work and wheel to effect a stock removal from the work, means automatically starting and automatically stopping the rotation of the work when the carriage is respectively in the position adjacent the wheel and remote therefrom, and means for effecting a relative axail reciprocation between the wheel and work during the grinding operation.

26. In a grinding machine, a grinding member and a work supporting member, an oscillatory carriage on which one of said members is mounted, oscillation of said carriage operating to move said grinding member and a workpiece in said supporting member into operative position relative to each other and to withdraw said grinding member and workpiece from operative position, and means for automatically controlling the rotation of the workpiece in response to oscillation of the carriage.

27. In a grinding machine, a grinding member and a work supporting member, an oscillatory carriage on which one of said members is mounted, oscillation of said carriage operating to move said grinding member and a workpiece in said supporting member into operative position relative to each other and to withdraw said grinding member and workpiece from operative position, and automatic controls operative at the limits of oscillation of the carrier for respectively starting and stopping the rotation of the workpiece.

28. In a grinding machine, a grinding member and a work supporting member, an oscillatory carriage on which one of said members is mounted, oscillation of said carriage operating to move said grinding member and a workpiece in said supporting member into operative position relative to each other and to withdraw said grinding member and workpiece from operative position, means to oscillate said carriage, and means responsive to said oscillation for starting and stopping the rotation of said workpiece in said work support.

29. In a grinding machine, a grinding member for interior engagement with a workpiece, a work supporting member for said workpiece, a carriage on which one of said members is mounted, means for supporting said carriage for oscillatory movement to shift said grinding member and said work supporting member into operative relation to each other and to withdraw said members relative to each other to permit replacement of the workpiece on the work supporting member, and fluid pressure means for oscillating said carrier into and out of operative position.

30. In a grinding machine, a grinding member for interior engagement with a workpiece, a work supporting member for said workpiece, a carriage on which one of said members is mounted, means for supporting said carriage for oscillatory movement to shift said grinding member and said work supporting member into operative relation to each other and to withdraw said members relative to each other to permit replacement of the workpiece on the work supporting member, fluid pressure means for oscillating said carrier into and out of operative position, and means for axially reciprocating one of said members relative to the other in operative position.

31. In a grinding machine, a grinding member for interior engagement with a workpiece, a work supporting member for said workpiece, a carriage on which one of said members is mounted, means for supporting said carriage for oscillatory movement to shift said grinding member and said work supporting member into operative relation to each other and to withdraw said members relative to each other to permit replacement of the workpiece on the work supporting member, fluid pressure means for oscillating said carrier into and out of operative position, and means to procure a translatory movement of one of said members to procure a radial feeding movement between said grinding member and the workpiece in the work holding member.

In testimony whereof we affix our signatures.

ROBERT E. W. HARRISON.
FREDERICK S. HAAS.
GEORGE W. BINNS.